(No Model.)

F. HUEBNER.
WEIGHING SCALES.

No. 276,693. Patented May 1, 1883.

Witnesses:

Inventor:
Fr. Huebner
By
Stout & Underwood
Attorneys

UNITED STATES PATENT OFFICE.

FRIEDRICH HUEBNER, OF MILWAUKEE, WISCONSIN.

WEIGHING-SCALE.

SPECIFICATION forming part of Letters Patent No. 276,693, dated May 1, 1883.

Application filed August 10, 1882. (No model.)

*To all whom it may concern:*

Be it known that I, FRIEDRICH HUEBNER, of Milwaukee, in the county of Milwaukee, and in the State of Wisconsin, have invented certain new and useful Improvements in Weighing-Scales; and I do hereby declare that the following is a full, clear, and exact description thereof.

My invention relates to pendulum weighing-scales; and it consists in certain peculiarities of construction, as will be fully set forth hereinafter.

Figure 1:
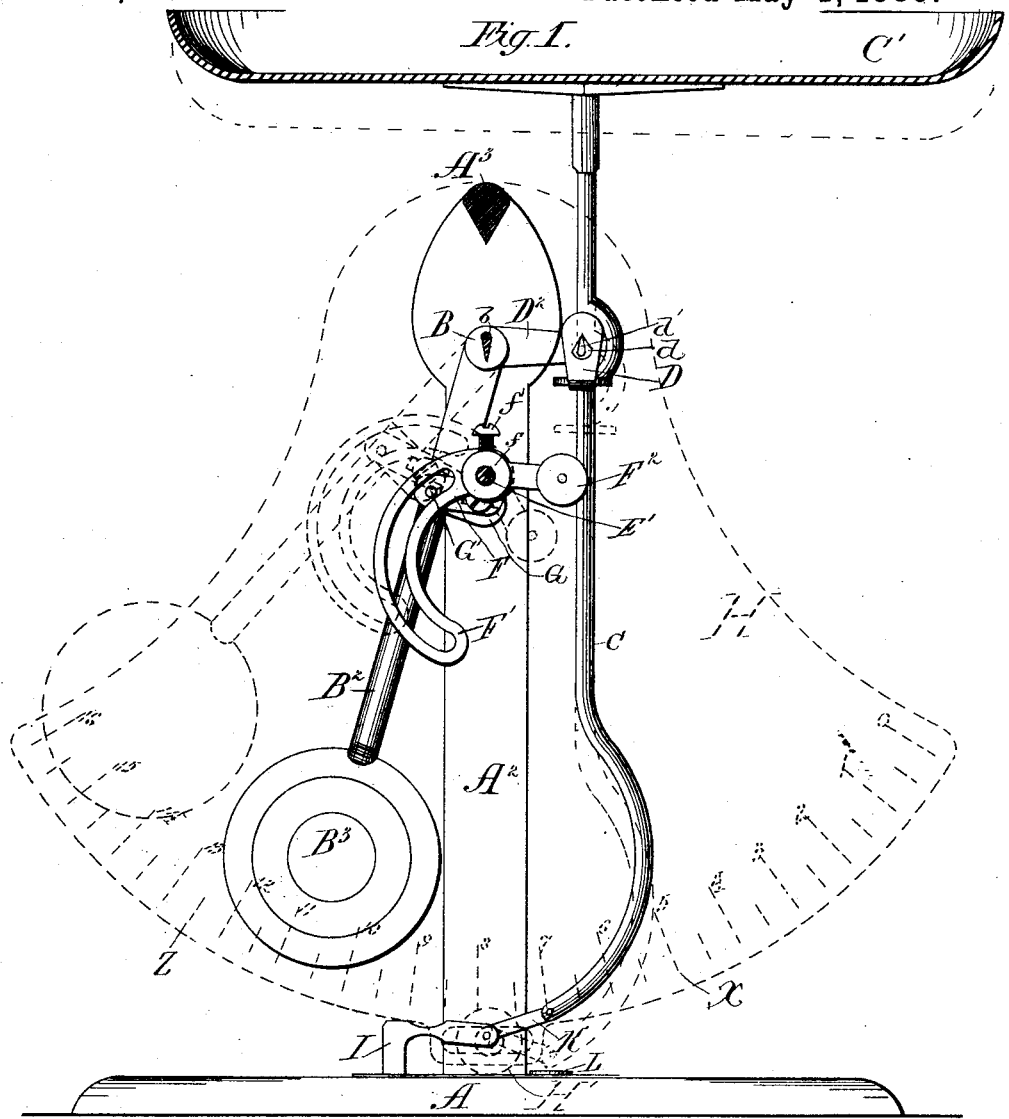
Figure 2:
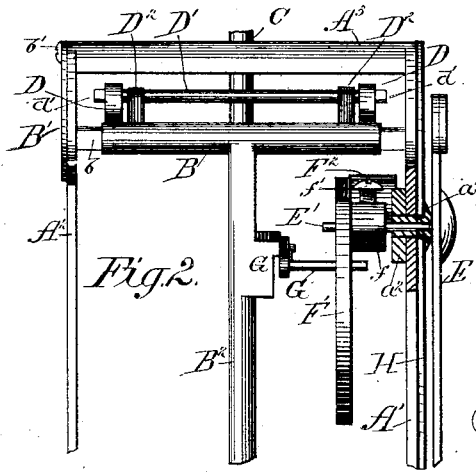

In the drawings, Figure 1 is a front elevation of my improved scale with the front standard and pointer removed and the face-plate or dial represented in dotted lines, and Fig. 2 is a perspective of portions of the device partially broken away or represented in section to show the bearings of the pointer-shaft.

A is the base of the scale, from which rise two standards, $A'$ $A^2$, connected at top by brace $A^3$. Just below this brace the standards are provided with apertures to receive the trunnions $b$ (having lower knife-edges) of the pendulum-shaft B. A plate, $B'$, is secured to the top of the rear standard by set-screw $b'$, and adapted to be tightened against said standard and the projecting trunnion on that side, so as to regulate the sensitiveness of the scale. This plate is also adapted to be turned to one side, so as to permit of the withdrawal of the pendulum and its attachment from the scale, as well as its lodgment in place in putting the parts together.

$B^2$ is the stem of the pendulum, screw-threaded at its base to receive the weight $B^3$, which, after adjustment upon the said stem to proper length, may be soldered to place.

C is the standard of the pan $C'$, and this standard is supported in a yoke, D, having apertures $d$ to receive the trunnions $d'$ (having upwardly-pointing knife-edges) of the rod $D'$, passing through the arms $D^2$ $D^2$, which project from and are integral with the shaft B.

E is the pointer, whose shaft $E'$ projects inwardly through a sleeve whose upset ends terminate in washers $a'$ $a^2$, embracing between them the front standard, $A'$, and the face-plate H of the scale, and to this shaft is secured the lever F, (shown in detail in Fig. 1,) which consists of the curved slotted arm $F'$, and straight arm having weight $F^2$, the said lever being mounted on a sleeve, $f$, secured to the pointer-shaft $E'$ by set-screw $f'$.

G is a lug on the pendulum-stem $B^2$, extending toward the pan-standard C, to which lug is secured the base of a pin, $G'$, adapted to work within the slot in the arm $F'$ of the pointer-lever F; and H is the dial or face-plate, pivoted on the sleeve of the pointer-shaft already named, and provided with a curved slot at its base, whereby the scale in the said face-plate may be adjusted so that the pointer will be at zero, when the plate may be secured in that position by tightening the base set-screw $H'$, the stem of which passes through said slot.

I is an L-shaped post rising from the base of the scale between the standards $A'$ $A^2$, and a link, K, connects the free end of this post with the base of the pan-standard C by loose pivots, so as to impart a toggle motion to said standard.

The several parts being all put together, as shown in the drawings, the operation will be now briefly described, premising with the statement that the full lines in Fig. 1 represent the position of the pendulum and attachments, with the pointer supposed to be at the point X, indicating a weight of five ounces, while the dotted lines represent the position of said parts when the weight has been increased to twelve and a half ounces, with the pointer at the point Z.

The function of the weighted and slotted pointer-lever F is as follows: The weight $F^2$ has always the tendency to carry the shaft $E'$ about, so as to throw the pointer E up to the highest number on the scale, which is only restrained by the action of the pendulum through its pin $G'$, operating within the slot in the arm $F'$ of said lever. Consequently when a weight is placed on the pan its standard C will be depressed, which will throw the pendulum out to the left, and at the same time will lift the pin, causing it to move up and toward the free end of the slotted arm, and hence permit the said slotted arm to be raised by the weighted arm of the said lever following the pin, which slides on the right-hand portion of said slotted arm, and carrying the pointer just as far to the left as the pin will permit, and this distance depends entirely upon the distance that the pendulum moves in the arc of a circle, in turn dependent upon the weight placed in the pan. The slot in the arm F' is made curved in order to compensate for the change in leverage, inasmuch as the resistance increases up to a certain point and then decreases, and hence the necessity of the curved construction, described and shown, of said slotted arm.

To prevent any jar from the contact of the lower end of the pan-standard with the base of the scale, I secure a rubber cushion, L, to the latter in any suitable manner.

What I claim as my invention, and desire to secure by Letters Patent, is—

1. The combination, in a weighing-scale, of the pointer-shaft carrying a curved and weighted lever on its rear end, with the pendulum carrying a pin that engages with said curved lever, as and for the purpose set forth.

2. The curved lever, slotted, as described, on one side of its fulcrum, and carrying a weight on its opposite end, in combination with the pointer-shaft, the pendulum, and its pin, as set forth.

3. The dial-plate pivoted to a sleeve that forms the bearing for the pointer-shaft, and having a slot in its lower edge, in combination with said sleeve, a set-screw, and with the front standard of the scale, as set forth.

4. In a weighing-scale, the base provided with rubber cushion L, in combination with the post I, standard C, and link K, as and for the purpose set forth.

In testimony that I claim the foregoing I have hereunto set my hand, on this 2d day of August, 1882, in the presence of two witnesses.

FRED. HUEBNER.

Witnesses:
STANLEY S. STOUT,
H. G. UNDERWOOD.